(12) United States Patent
Endo

(10) Patent No.: US 11,367,415 B2
(45) Date of Patent: Jun. 21, 2022

(54) SEMICONDUCTOR APPARATUS

(71) Applicant: ROHM CO., LTD., Kyoto (JP)

(72) Inventor: Hiroharu Endo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/930,942

(22) Filed: Jul. 16, 2020

(65) Prior Publication Data

US 2020/0357364 A1 Nov. 12, 2020

Related U.S. Application Data

(63) Continuation of application No. PCT/JP2019/001772, filed on Jan. 22, 2019.

(30) Foreign Application Priority Data

Jan. 23, 2018 (JP) .............................. JP2018-008815

(51) Int. Cl.
*G09G 5/18* (2006.01)
*G09G 3/20* (2006.01)
*G09G 3/34* (2006.01)

(52) U.S. Cl.
CPC ............ *G09G 5/18* (2013.01); *G09G 3/2003* (2013.01); *G09G 3/3413* (2013.01); *G09G 2340/02* (2013.01); *G09G 2360/02* (2013.01)

(58) Field of Classification Search
CPC ............ G09G 5/18; G09G 5/38; G09G 5/024; G09G 5/40; G09G 5/377; G09G 3/2003; G09G 3/3413; G09G 2340/02; G09G 2340/125; G09G 2360/02; G09G 2360/08; G09G 2330/026; G09G 2380/10; H04N 5/66

See application file for complete search history.

(56) References Cited

U.S. PATENT DOCUMENTS

| 2009/0179918 A1* | 7/2009 | Lai ............................. G06F 3/14 345/629 |
| 2017/0337884 A1* | 11/2017 | Kurokawa ............ G09G 3/2092 |
| 2018/0061308 A1* | 3/2018 | Bae ........................ G09G 5/393 |

FOREIGN PATENT DOCUMENTS

| JP | H06317782 A | 11/1994 |
| JP | H08276624 A | 10/1996 |
| JP | H09275563 A | 10/1997 |

(Continued)

OTHER PUBLICATIONS

International Preliminary Report on Patentatibility for International Application No. PCT/JP2019/001772; dated Aug. 6, 2020.

(Continued)

*Primary Examiner* — Brent D Castiaux
(74) *Attorney, Agent, or Firm* — Cantor Colburn LLP

(57) ABSTRACT

In a normal state, a video input interface receives video data. In a setup state, a control input interface receives multiple items of compressed image data, and stores the compressed image data in memory. In the normal state, a decoder reads one item from among the multiple items of compressed image data from the memory according to an instruction signal that indicates graphics data to be displayed, and decodes the compressed image data thus read so as to reproduce the original graphics data before compression. A multiplexer superimposes the graphics data on the video data.

12 Claims, 11 Drawing Sheets

(56) References Cited

FOREIGN PATENT DOCUMENTS

| | | | |
|---|---|---|---|
| JP | 2002169524 A | | 6/2002 |
| JP | 2005091871 A | | 4/2005 |
| JP | 2008181017 A | * | 8/2008 |
| JP | 2008181017 A | | 8/2008 |
| JP | 2008256965 A | | 10/2008 |
| WO | 2018003669 A1 | | 1/2018 |

OTHER PUBLICATIONS

International Search Report for International Application No. PCT/JP2019/001772; dated Apr. 16, 2019.
JPO Notice of Reasons for Refusal for corresponding JP Application No. 2019-567072; dated Aug. 3, 2021.
JPO Decision of Refusal for corresponding JP Application No. 20219-567072; dated Feb. 15, 2022.
CNIPA First Office Action for corresponding CN Application No. 20198009761.4; dated May 9, 2022.

* cited by examiner

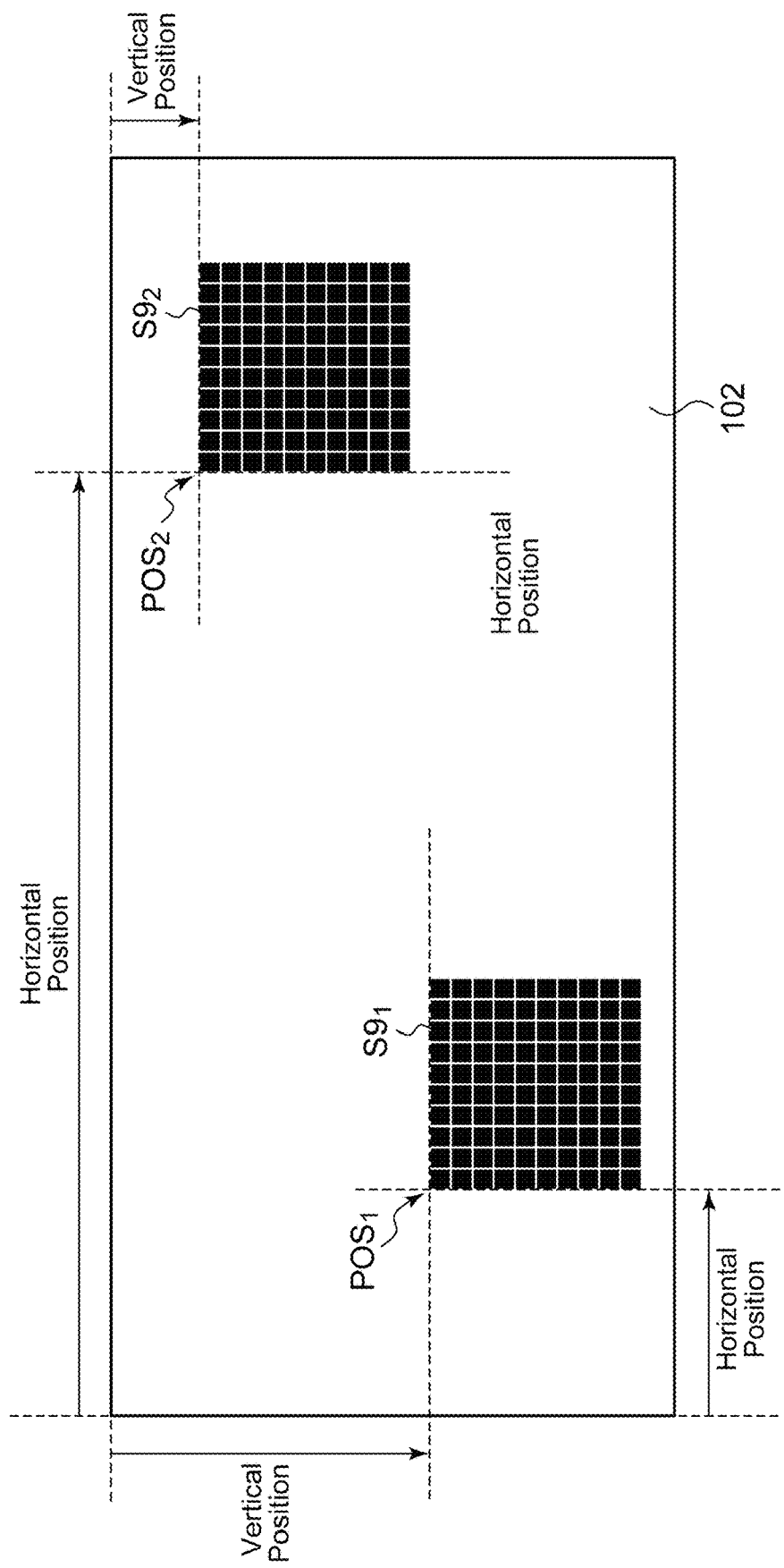

FIG. 7

| RUN-LENGTH VALUE RL (pixels) | DATA COMPRESSION RATE (AFTER COMPRESSION / BEFORE COMPRESSION) | NUMBER OF RUN-LENGTH WORDS |
|---|---|---|
| 1 | 1.25 | 0 |
| ~ 17 | 1.25 ~ 0.15 | 1 |
| ~ 257 | 0.2 ~ 0.015 | 2 |
| ~ 4097 | 0.02 ~ 0.0012 | 3 |

SEMICONDUCTOR APPARATUS

CROSS REFERENCE TO RELATED APPLICATIONS

This application is a continuation under 35 U.S.C. § 120 of PCT/JP2019/001772, filed Jan. 22, 2019, which is incorporated herein reference and which claimed priority to Japanese Application No. 2018-008815, filed Jan. 23, 2018. The present application likewise claims priority under 35 U.S.C. § 119 to Japanese Application No. 2018-008815, filed Jan. 19, 2018 the entire content of which is also incorporated herein by reference.

BACKGROUND

1. Technical Field

The present invention relates to a semiconductor apparatus including an interface for a digital video signal.

2. Description of the Related Art

FIG. 1 is a block diagram showing an image display system. An image display system 100R includes a display panel 102 configured as a liquid crystal panel, organic EL panel or the like, a gate driver 104, a source driver 106, a graphics controller 110, and a timing controller 200R. The graphics controller 110 generates image data to be displayed on the display panel 102. The image data includes pixel (RGB) data, which is to be transmitted in a serial format to the timing controller 200R.

The timing controller 200R receives the image data, and generates various kinds of control/synchronization signals. The gate driver 104 sequentially selects scanning lines Ls of the display panel 102 in synchronization with a signal received from the timing controller 200R. Furthermore, the RGB data is supplied to the source driver 106.

The timing controller 200R includes a reception circuit 202, a transmission circuit 204, and a logic circuit 210. The reception circuit 202 receives the image data transmitted in a serial format from the graphics controller 110. ROM 111 configured as an external component stores identification (ID) information, resolution information, refresh rate information, etc., with respect to the display panel 102. The logic circuit 210 generates a control/synchronization signal based on the image data received by the reception circuit 202. The transmission circuit 204 outputs the control signal and the image data to the gate driver 104 and the source driver 106.

In some cases, in addition to a function of displaying the image data received by the reception circuit 202, the timing controller 200R is required to have an On Screen Display (OSD) function for displaying predetermined characters, figures, and icons (which will also be referred to simply as "graphics" hereafter). In order to meet such a request, the logic circuit 210 includes an OSD circuit 212.

The ROM 111 stores bitmap data of several characters or icons. The timing controller 200R reads, from the ROM 111, bitmap graphics data that corresponds to a control signal input in addition to the image data. The timing controller 200R displays the bitmap graphics data on the display panel 102.

With the timing controller 200R according to a conventional technique, such bitmap graphics data is required to be stored in the ROM 111. However, the capacity of the ROM 111 is limited. Accordingly, such an arrangement has a problem in that it is difficult to support a large number of pixels for graphics. Furthermore, the timing controller 200R can display only graphics data stored in the ROM 111. Accordingly, after it is shipped as a product, it is difficult to change and add graphics. As described above, such a timing controller according to a conventional technique has a problem of an OSD function with poor flexibility.

SUMMARY

The present disclosure has been made in order to solve such a problem.

One embodiment of the present disclosure relates to a semiconductor apparatus. The semiconductor apparatus includes: a video input interface structured to receive video data in a normal state; memory; a control input interface structured, in a setup state, to receive multiple items of compressed image data, and to store the compressed image data in the memory; and a decoder structured, in the normal state, to read from the memory one item that corresponds to an instruction signal from among the multiple items of compressed image data, and to decode the compressed image data thus read, so as to reproduce original graphics data before compression; and a multiplexer structured to superimpose the graphics data on the video data.

Another embodiment of the present disclosure relates to an electronic device. The electronic device includes the semiconductor apparatus described above.

One embodiment of the present disclosure relates to a display apparatus. The display apparatus includes the semiconductor apparatus described above.

It should be noted that any combination of the components described above or any manifestation thereof, may be mutually substituted between a method, apparatus, and so forth, which are also effective as an embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a diagram showing a display panel displaying two items of graphics data;

FIG. 7 is a diagram showing the data compression rate for the same-color segment in a case in which the second data structure shown in FIG. 5B is employed;

OVERVIEW OF THE EMBODIMENTS

Figure 1:
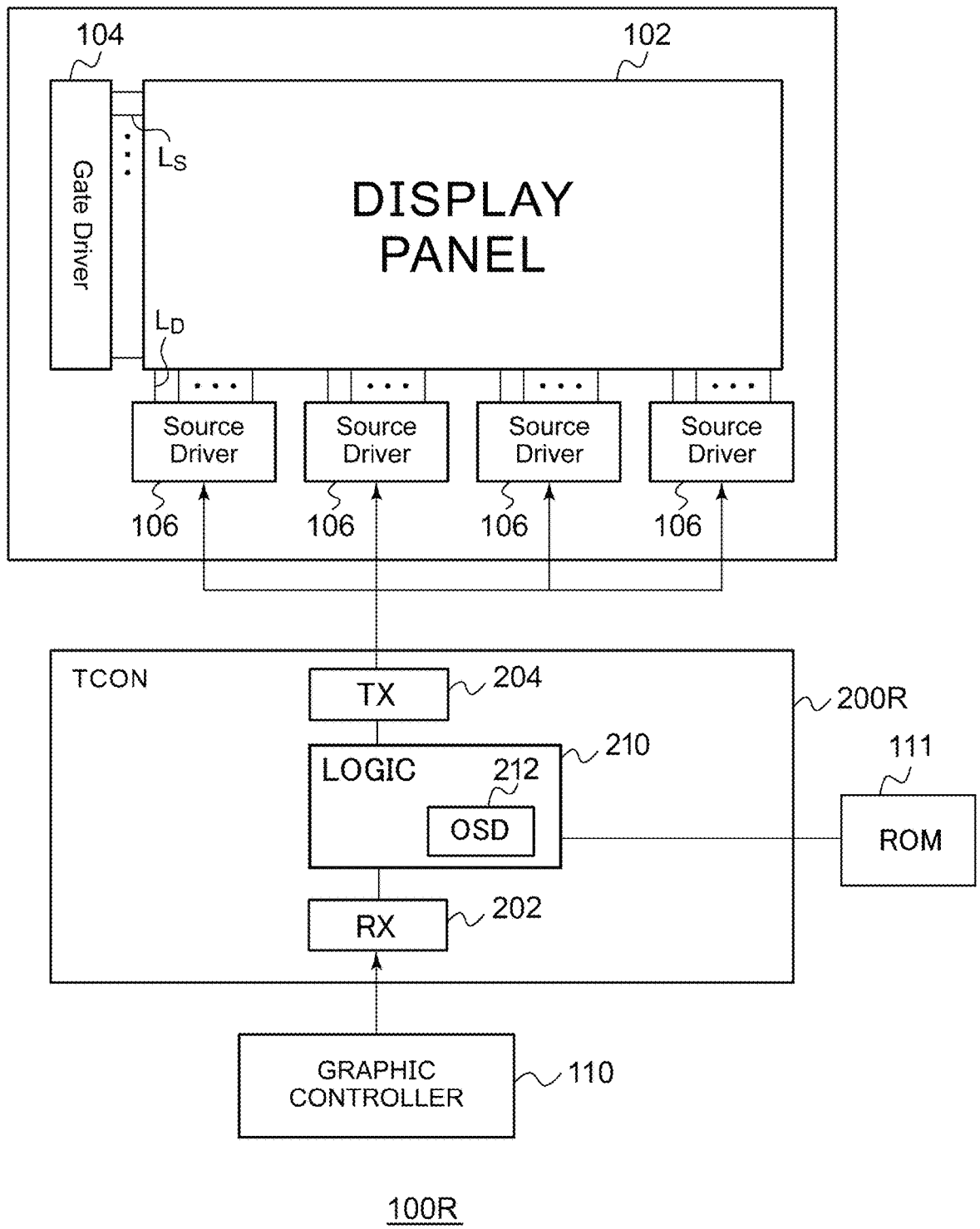
FIG. 1 is a block diagram showing an image display system.

An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later.

One embodiment disclosed in the present specification relates to a semiconductor apparatus. The semiconductor apparatus includes: a video input interface structured to receive video data in a normal state; memory; a control input interface structured, in a setup state, to receive multiple items of compressed image data, and to store the compressed image data in the memory; and a decoder structured, in the normal state, to read from the memory one item that corresponds to an instruction signal from among the multiple items of compressed image data, and to decode the compressed image data thus read, so as to reproduce original graphics data before compression; and a multiplexer structured to superimpose the graphics data on the video data. OSD graphics data is loaded in a compressed state beforehand to the semiconductor apparatus for every setup operation of the semiconductor apparatus, thereby allowing various kinds of graphics data to be displayed. Furthermore, such an arrangement allows the capacity of ROM that holds the graphics data to be reduced. Moreover, such an arrangement allows the communication amount to be reduced in the loading. It should be noted that examples of such graphics data include figures, icons, characters, and any desired combination thereof.

In one embodiment, the compressed image data may be generated by compressing the graphics data using a run-length compression method. Also, the compressed image data may include at least one item of segment data. Also, each segment data may represent a same-color segment including consecutive pixels having the same color. This allows the decoder to have a reduced circuit scale. Furthermore, this allows the memory capacity to be reduced.

In one embodiment, the segment data may include color data that represents color and a run-length value that represents the number of consecutive pixels. Also, the run-length value may be configured to have a variable format length. This provides a further improved data compression rate.

In one embodiment, the segment data may include: a color word including a separator bit and the color data; and at least one run-length word including a separator bit and a run-length value.

In one embodiment, the segment data may include: a color word including the color data; a word-number indication bit that indicates the number of words that represent the run-length value; and run-length words, the number of which matches the number of words represented by the word-number indication bit.

In one embodiment, the control input interface may receive size data that indicates the pixel size of the graphics data. Also, the control input interface may store the compressed image data in the memory together with the size data thus received. This allows graphics data having various sizes to be displayed.

In one embodiment, the instruction signal may include position information that indicates the position at which the graphics data is to be displayed. Also, the multiplexer may display the graphics data at a position that corresponds to the position information. This provides a more flexible OSD function.

In one embodiment, the control input interface may be structured as a Serial Peripheral Interface (SPI) or an Inter-Integrated Circuit (I$^2$C) interface. Such interfaces are widely employed for general purposes, thereby allowing the control input interface to be easily supported.

EMBODIMENTS

The present disclosure will now be described based on preferred embodiments which do not intend to limit the scope of the present disclosure but exemplify the present disclosure. All of the features and the combinations thereof described in the embodiment are not necessarily essential to the invention.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

In the present specification, a state represented by the phrase "the member A is coupled to the member B" includes a state in which the member A is indirectly coupled to the member B via another member that does not substantially affect the electric connection between them, or that does not damage the functions of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions of the connection between them, in addition to a state in which they are directly coupled.

Figure 2:
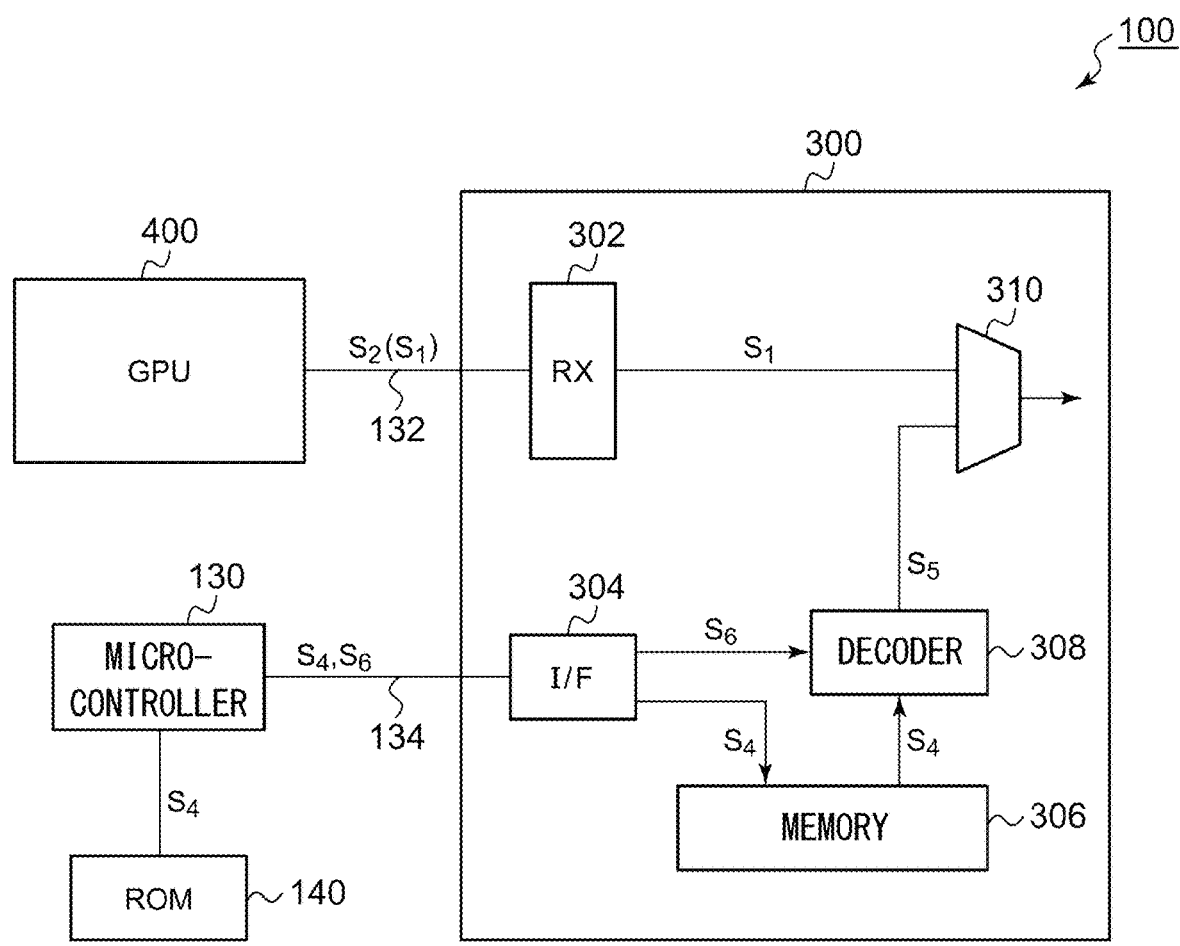
FIG. 2 is a block diagram showing an image display system including a semiconductor apparatus according to an embodiment.

FIG. 2 is a block diagram showing an image display system 100 including a semiconductor apparatus 300 according to an embodiment. The image display system 100 includes a semiconductor apparatus 300, a graphics processor 400, and a microcontroller (processor) 130.

The graphics processor 400 is configured as a Graphics Processing Unit (GPU) or the like, and generates video data $S_1$. The graphics processor 400 includes a transmitter (video output interface) that conforms to the HDMI (trademark) standard, DisplayPort standard, or digital visual interface (DVI) standard. The graphics processor 400 is coupled to the semiconductor apparatus 300 via a video transmission line 132. A digital video signal $S_2$ including the video data $S_1$ is transmitted in a serial format to the semiconductor apparatus 300.

The microcontroller (processor) 130 integrally controls the image display system 100. The microcontroller 130 and the semiconductor apparatus 300 are coupled via a control line 134 that differs from the video transmission line 132. As the control line 134, an I²C interface or SPI may be employed.

The microcontroller 130 is coupled to nonvolatile memory 140. The nonvolatile memory 140 is configured as a hard disk, a Solid State Drive (SSD), Electrically Erasable Programmable Read-Only Memory (EEPROM), flash memory, or the like. However, the present disclosure is not restricted to such an arrangement. The nonvolatile memory 140 stores compressed image data $S_4$ obtained by compressing OSD graphics data (OSD character data) $S_5$ using a predetermined data compression method.

In a setup state of the image display system 100, the microcontroller 130 reads the compressed image data $S_4$ from the nonvolatile memory 140, and transmits the compressed image data $S_4$ to the semiconductor apparatus 300 via the control line 134.

The functions of the microcontroller 130 may be integrated in the graphics processor 400. In this case, the graphics processor 400 includes a control interface as a built-in component.

The semiconductor apparatus 300 may be configured as various kinds of devices including a video input interface that is capable of receiving the digital video signal $S_2$ from the graphics processor 400. That is to say, the kind of the semiconductor apparatus is not restricted in particular.

The semiconductor apparatus 300 includes a video input interface 302, a control input interface 304, memory 306, a decoder 308, and a multiplexer 310.

The semiconductor apparatus 300 (or the image display system 100) has a setup state for initializing (or changing the settings of) a circuit (or system), and a normal state in which the semiconductor apparatus 300 executes its primary operation after the setup state. The semiconductor apparatus 300 may be configured such that the semiconductor apparatus 300 is set to the setup state upon receiving a command supplied from an external circuit. For example, the semiconductor apparatus 300 may be provided with a register as an internal component associated with the setup state. Upon writing "1" to the register from an external circuit (e.g., the microcontroller 130), the semiconductor apparatus 300 may be switched to the setup state. This arrangement allows the semiconductor apparatus 300 to be switched to the setup state at a desired timing in addition to immediately after the start-up operation of the semiconductor apparatus 300.

The video input interface 302 is coupled to the graphics processor 400 via the video transmission line 132. In the normal state, the video input interface 302 receives the digital video signal $S_2$ including the video data $S_1$.

The control input interface 304 is coupled to the microcontroller 130 via the control line 134. As the control input interface 304, a register access interface may be employed. For example, a Serial Peripheral Interface (SPI) or an Inter-Integrated Circuit (I²C) interface may preferably be employed. However, the present disclosure is not restricted to such an arrangement. In the setup state, the control input interface 304 receives multiple items of compressed image data $S_4$ from the microcontroller 130, and stores the compressed image data $S_4$ thus received in the memory 306. The memory 306 may be configured as Static Random Access Memory (SRAM). However, the present disclosure is not restricted to such an arrangement.

As described above, the compressed image data $S_4$ is obtained by compressing, in a predetermined format, the graphics data $S_5$ to be used for the OSD.

An ID is assigned to each of the multiple items of compressed image data $S_4$. Address information $S_7$ that indicates the address at which each item of compressed image data $S_4$ is stored is held such that it is associated with each ID.

The graphics data $S_5$ may be configured as monochrome bitmap data or color bitmap data. However, the present disclosure is not restricted to such an arrangement. Also, the graphics data $S_5$ may represent a desired target, examples of which include icons, figures, characters, etc.

Furthermore, in the normal state, the control input interface 304 receives an instruction signal $S_6$ that designates the graphics data to be displayed by the OSD. The decoder 308 reads, from the memory 306, one from among the multiple items of compressed image data according to the instruction signal $S_6$. Furthermore, the decoder 308 decodes the compressed image data thus read, so as to reproduce the original graphics data $S_5$ before compression.

The multiplexer 310 superimposes the graphics data $S_5$ decoded by the decoder 308 on the video data $S_1$ received by the video input interface 302. The multiplexer 310 may preferably support the processing using a known technique. That is to say, such an arrangement is not restricted in particular. For example, a region (or effective pixel area) in which the graphics data $S_5$ is to be arranged may be extracted from a frame indicated by the video data $S_1$. Furthermore, the brightness values of the extracted region may be replaced by the brightness values of the graphics data $S_5$.

It should be noted that such an arrangement is preferably capable of controlling the display position at which the graphics data $S_5$ is displayed. The instruction signal $S_6$ may include position information POS that indicates the position at which the graphics data $S_5$ is to be displayed. The multiplexer 310 displays the graphics data $S_5$ at a position that corresponds to the position information POS. The above is the configuration of the image display system 100 including the semiconductor apparatus 300.

The above is the configuration of the semiconductor apparatus 300 and the image display system 100. Next, description will be made regarding the compressing of the graphics data $S_5$. The graphics data $S_5$ may be compressed using the run-length compression method.

Figure 3:
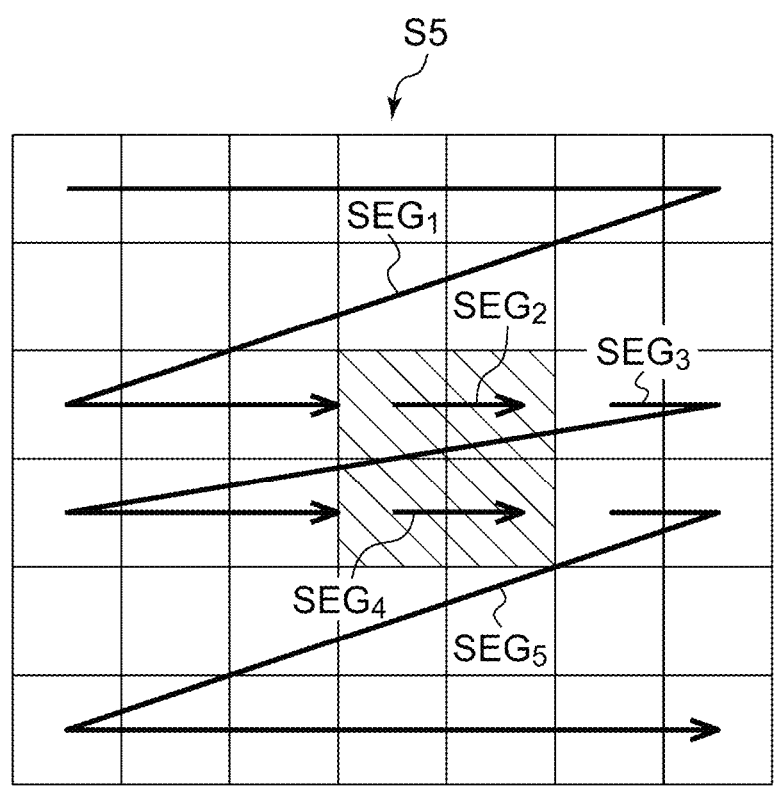
FIG. 3 is a diagram for explaining run-length compression of compressed image data.

FIG. 3 is a diagram for explaining the run-length compression of the graphics data $S_5$. For simplification of description, FIG. 3 shows an example in which the graphics data $S_5$ is configured as (7×6)-pixel graphics data. In actuality, the graphics data $S_5$ may be configured as (50×50)-pixel graphics data or (100×100)-pixel graphics data. Also, the graphics data $S_5$ may be configured as graphics data including a different number of pixels. Also, the graphics data $S_5$ may be configured such that there is a difference in the number of pixels between the vertical direction and the horizontal direction.

With the run-length compression method, consecutive pixels having the same color (which will be referred to as a "same-color segment") are converted into a combination of the color data CD and the run-length value RL that indicates the number of the consecutive pixels. The run-length compression is sequentially executed from the top line to the bottom line. Furthermore, the run-length compression is sequentially executed for each line in order from the leftmost pixel to the rightmost pixel. In FIG. 3, each arrow indicates a same-color segment SEG.

The color data CD may be represented by 24 bits of data composed of 8 bits each for R, G, and B.

The graphics data $S_5$ shown in FIG. 3 is divided into five same-color segments $SEG_1$ through $SEG_5$. The same-color segments $SEG_1$ through $SEG_5$ are represented by the run-length values RL, i.e., 17, 2, 5, 2, and 16, respectively. Furthermore, the same-color segments $SEG_1$, $SEG_3$, and $SEG_5$ each have a first color. The same-color segments $SEG_2$ and $SEG_4$ each have a second color. Accordingly, the compressed image data $S_4$ that corresponds to a single item of graphics data $S_5$ can be represented by one or multiple items of the segment data SEG.

Figure 4:
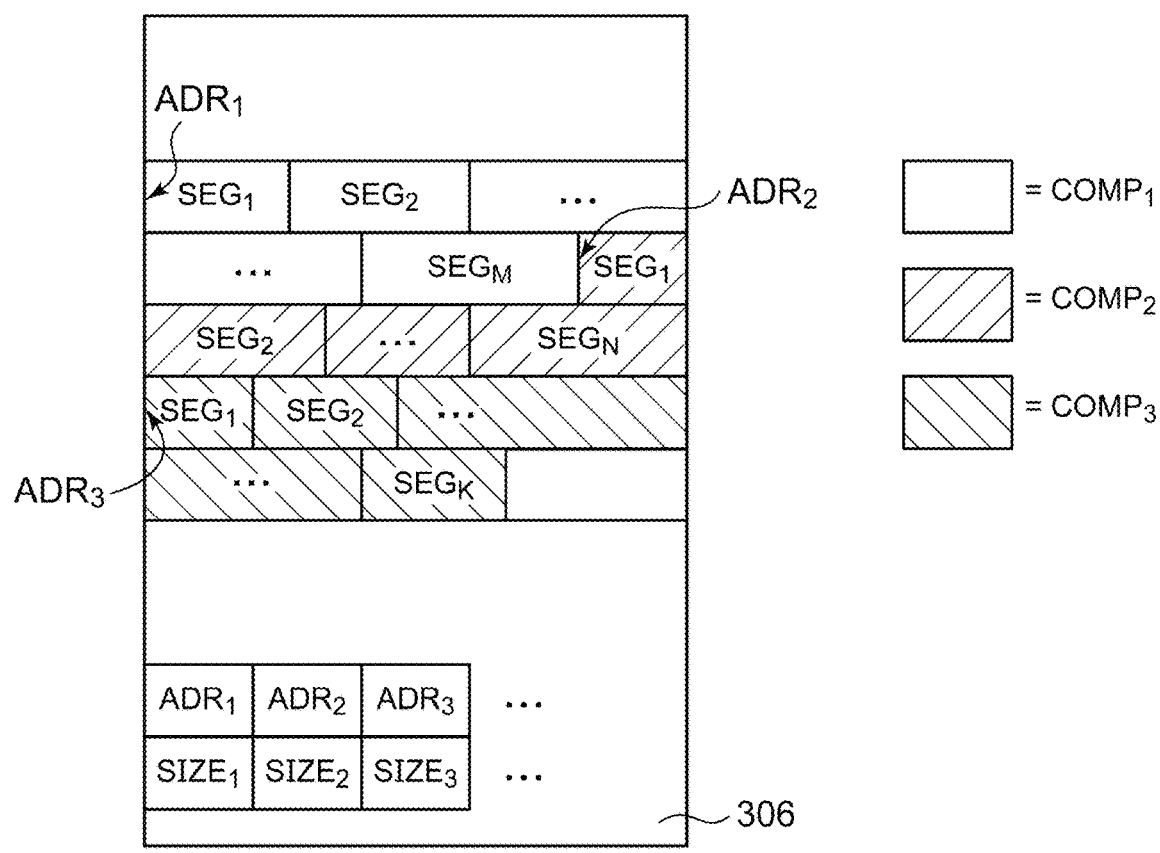
FIG. 4 is a diagram showing compressed image data COMP stored in nonvolatile memory or memory.

FIG. 4 is a diagram showing the compressed image data $COMP(S_4)$ in the nonvolatile memory 140 or the memory 306. The first compressed image data $COMP_1$ includes M items of segment data that represent M same-color segments. The second compressed image data $COMP_2$ includes N items of segment data. The third compressed image data COMP3 includes K items of segment data. The initial address of each compressed image data COMP is stored as address information ADR in the memory 306.

The graphics data $S_5$ may be designed to have a fixed size (fixed number of pixels). For example, the graphics data $S_5$ may be configured as (50×50)-pixel graphics data. Also, in order to provide improved flexibility, such an arrangement may be configured to allow the user to select the size of the graphics data $S_5$ from among multiple options. For example, the semiconductor apparatus 300 may be configured to support two kinds of graphics data, i.e., (50×50)-pixel graphics data and (100×100)-pixel graphics data. In this case, in the setup state, the size data SIZE that indicates the size of the graphics data $S_5$ may preferably be input in addition to the graphics data $S_5$ itself. The size data SIZE is recorded in the memory 306 such that it is associated with the ID of the graphics data $S_5$.

In order to provide further improved flexibility, the semiconductor apparatus 300 may be configured to allow the user to freely specify the size of the graphics data $S_5$. For example, in the setup state, the size data SIZE that indicates the number of vertical pixels and the number of horizontal pixels may preferably be input in addition to the graphics data $S_5$. The size data is recorded in the memory 306 such that it is associated with the ID of the graphics data $S_5$.

Figure 5A:
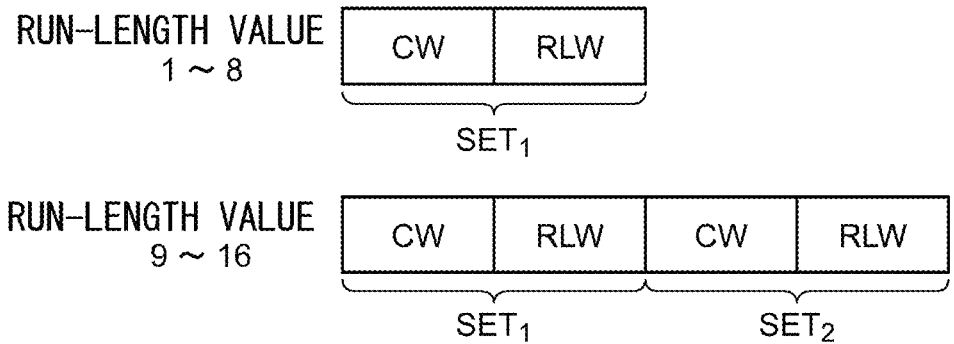
FIGS. 5A through 5C are diagrams each showing a data structure of a same-color segment SEG.
Figure 5B:
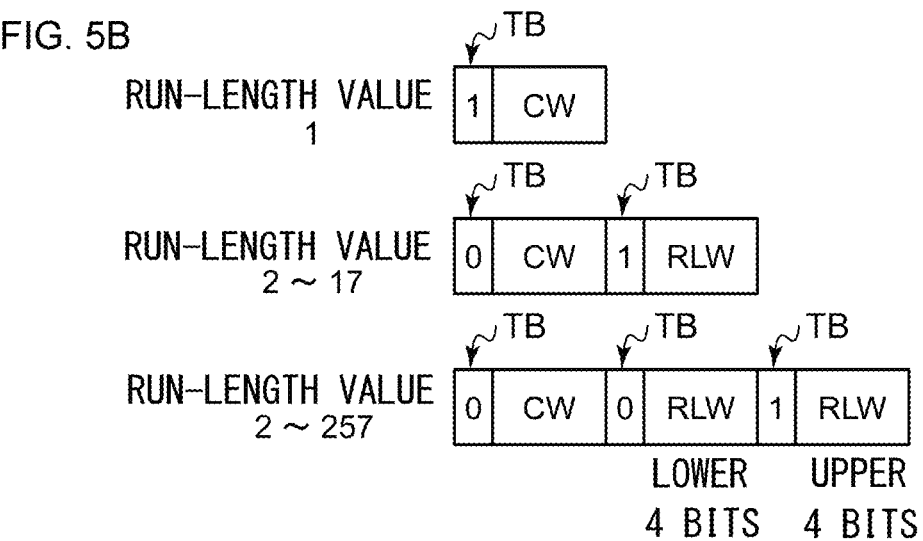
Figure 5C:
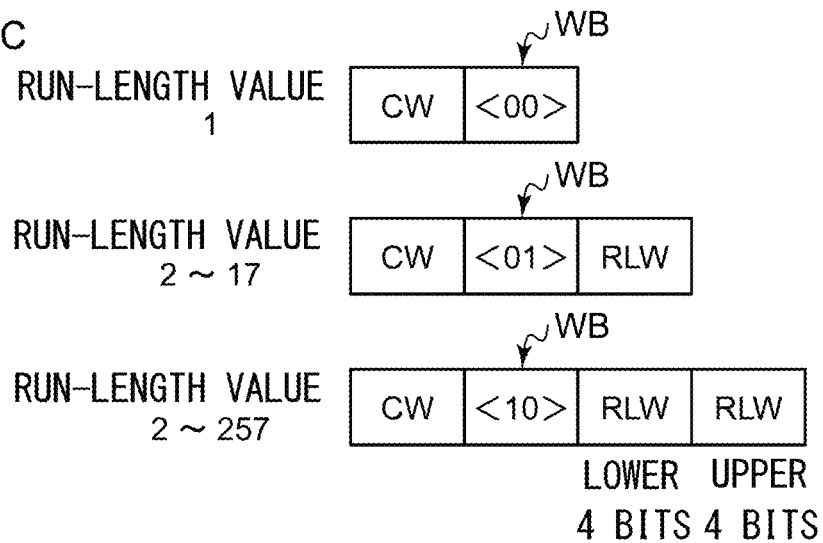

FIG. 5A through FIG. 5C are diagrams each showing a data structure of the same-color segment SEG. FIG. 5A shows a first data structure. The data of one same-color segment SEG (segment data) includes one or multiple combinations of a color word CW and a run-length word RLW.

In a case in which each run-length word RLW is configured as 3 bits of data, and in a case in which the number of consecutive pixels of "0" is not represented by the run-length word RLW, this arrangement allows a run-length word RLW ranging from <000> to <111> to represent a run-length value ranging from 1 to 8.

As with a case of the same-color segment $SEG_2$ ($SEG_3$, $SEG_4$), in a case in which the same-number segment is represented by a run-length value RL of 8 or less, as shown in FIG. 5A, the compressed image data of the same-color segment is represented by a single set $SET_1$ including a single color word CW and a single run-length word RLW.

In a case in which a given same-color segment SEG is represented by a run-length value RL of 9 or more, one same-color segment SEG is represented by multiple sets having the same color data CD value. For example, in a case in which the same-color segment $SEG_1$ is represented by the run-length value RL of 17, the number of the same-color consecutive pixels is divided into 16 and 1. That is to say, the same-color segment $SEG_1$ is represented by two of the sets $SET_1$ and $SET_2$. Here, the two sets $SET_1$ and $SET_2$ have the same color word CW. The run-length word RLW of the first set is set to <111>, and the run-length word RLW of the second set is set to <011>.

In a case in which the run-length value RL is 17 to 24, the run-length value RL can be divided into (8+8+a) run-length values (1≤a≤8). In this case, the same-color segment SEG can be represented by three of the sets SET.

It should be noted that, for ease of understanding, description has been made regarding an arrangement in which each word is configured as 3 bits of data. However, the present disclosure is not restricted to such an arrangement. Also, each word may be designed to have a data amount on the order of 4 to 6 bits. The optimum number of bits to be assigned to each word may preferably be determined so as to provide an improved data compression rate giving consideration to the shape or size of the graphics data.

FIG. 5B shows a second data structure. The second data structure supports a run-length value RL having a variable format length.

A separator bit that indicates a boundary between the same-color segments SEG is included at the beginning of the color word CW and the run-length word RLW. FIG. 5B shows an example in which the separator bit is configured as a terminal bit TB that indicates a terminal same-color segment. Specifically, when the separator bit is set to a value of "1", it indicates the terminal same-color segment. Instead of indicating the terminal same-color segment, the separator bit may be designed to indicate a starting same-color segment.

In a case in which the same-color segment is represented by a run-length value RL of 1, the second data structure may be designed to include only the color word CW with the terminal bit TB of 1, and to include no run-length word RLW. This arrangement provides a further improved data compression rate. With this arrangement, the run-length value ranging between 2 and 17 can be represented by four-bit run-length words RLW ranging from <0000> to <1111>.

For example, in a case in which given graphics data represents a character, in order to support smooth font display, in some cases, such an arrangement supports anti-aliasing. In many cases, this arrangement provides the contour portion of the character with a same-color segment having a run-length value RL of 1. By representing the run-length value RL=1 by the second data structure without a run-length word RLW, this arrangement provides an improved data compression rate particularly for such character data.

When the terminal bit TB=1 is appended to the second run-length word RLW, the run-length value is represented by two words configured as 8 bits of data. For example, the first run-length word RLW may be assigned to the lower 4 bits, and the second run-length word RLW may be assigned to the upper 4 bits, or vice versa. An 8-bit run-length value RL ranging from <00000000> to <11111111> obtained by coupling the two run-length words RLW represents values of 2 to 257.

It should be noted that, in a case in which a preceding run-length word RLW is assigned to the run-length value in order from the lower bits of the run-length value, in the decoding operation, this arrangement is capable of marking (i.e., rasterizing) the pixel group that corresponds to the run-length value RL represented by the preceding run-length word RLW before reading the subsequent run-length word RLW.

When the terminal bit TB=1 is appended to the third run-length word RLW, the run-length value RL is represented by three words configured as 12 bits of data.

With the first data structure shown in FIG. 5A, each set SET includes a color word CW having the same value. In some cases, such a redundant data structure leads to a poor data compression rate. In contrast, with the second data structure, this arrangement involves no redundancy with respect to the color word CW, thereby providing an improved data compression rate.

FIG. 5C shows a third data structure. As with the second data structure, the third data structure supports a run-length value RL with a variable format length. With the third data structure, the segment data includes no terminal bit TB for each word. Instead, a bit (word-number indication bit) WB that indicates the number of words that represent the run-length value RL is inserted. The number of bits assigned to the word-number indication bit is not restricted in particular. Description will be made regarding an example in which the word-number indication bit is configured as 2 bits of data. When the run-length value RL is a value ranging between 2 and 17, the word-number indication bit WB is set to 1 (represented by a binary value <01>). In this case, the segment data includes a single run-length word RLW. When the run-length value RL is a value ranging between 2 and 257, the word-number indication bit WB is set to 2 (represented by a binary value <10>). In this case, the segment data includes two run-length words RLW. The first run-length word RLW may represent the lower 4 bits of the run-length value RL, and the second run-length word RLW may represent the upper 4 bits of the run-length value RL.

With the second data structure shown in FIG. 5B, as the number of words that represent the run-length value becomes larger, the total number of the terminal bits TB becomes larger, leading to a reduced data compression rate. In contrast, with the third data structure, the number of bits of the word-number bit WB is maintained at a constant value even if the number of words that represent the run-length value is increased, thereby suppressing a reduction in the data compression rate. It should be noted that each of the second data structure and the third data structure may preferably be designed so as to provide an improved data compression rate giving consideration to the shape and size of the graphics data.

Various other kinds of data structures are conceivable as follows. For example, in the second or third data structures, the sum total of multiple run-length words RLW may be defined as the run-length value RL in the same manner as with the first data structure. For example, the segment data may be designed such that, when the segment data includes two run-length words RLW of binary values <0001> and <1111>, the two run-length words RLW represent a run-length value RL of (20=3+17).

Next, description will be made regarding the operation of the image display system 100.

1. Setup State

After the image display system 100 including the semiconductor apparatus 300 is started up, the image display system 100 is set to the setup state. The microcontroller 130 transmits multiple items of compressed image data $S_4$ to the control input interface 304 together with the size data SIZE for the respective items of compressed image data $S_4$.

The semiconductor apparatus 300 stores the multiple items of compressed image data $S_4$ received in the setup state in the memory 306.

2. Normal State

The graphics processor 400 transmits the digital video signal $S_2$ via the video transmission line 132.

When graphics are to be displayed on the display panel using the OSD function, the microcontroller 130 transmits the instruction signal $S_6$ via a line that differs from the digital video signal $S_2$ line. The instruction signal $S_6$ includes ID information that designates one from among the multiple items of compressed image data $S_4$ (graphics data $S_5$) transmitted to the semiconductor apparatus 300 in the setup state, and the position information POS that indicates the display position.

The decoder 308 refers to the address information $S_7$ that corresponds to the ID information based on the instruction signal $S_6$ received by the control input interface 304, and accesses the compressed image data $S_4$ that corresponds to the address information $S_7$. Furthermore, the decoder 308 decodes the compressed image data $S_4$ based on the size data SIZE so as to expand it to the graphics data $S_5$ in a bitmap format. The multiplexer 310 displays the graphics data $S_5$ at a position designated by the position information POS.

FIG. 6 is a diagram showing the display panel 102 displaying two items of graphics data $S_{5\_1}$ and $S_{5\_2}$.

The above is the operation of the image display system 100. Next, description will be made regarding the advantages thereof.

In the setup operation of the image display system 100, the graphics data to be used in the OSD is supplied to the semiconductor apparatus 300. This allows various kinds of graphics data to be displayed.

Furthermore, the graphics data $S_5$ is stored in the memory 306 in a compressed format. This allows the memory 306 to have a reduced memory capacity, thereby providing a reduced cost. Furthermore, with such a data compression operation, this allows the amount of information transmitted from the microcontroller 130 to the semiconductor apparatus 300 to be reduced. Moreover, the graphics data is stored in the nonvolatile memory 140 in a compressed format, thereby allowing the nonvolatile memory 140 to have a reduced memory capacity.

FIG. 7 is a diagram for explaining the data compression rate with respect to the same-color segment in a case in which the second data structure shown in FIG. 5B is employed. Description will be made below assuming that the run-length word RLW has a bit width of 4 bits. The data compression rate is increased according to an increase in the run-length value RL. In a case in which the run-length value is 1 or 2, the segment data has a data amount that is larger than the original pixel data. However, in many cases, such a run-length value of 1 or 2 is used only for anti-aliasing for characters, icons, and figures. That is to say, such a run-length value of 1 or 2 is used with very low probability. Accordingly, such an arrangement provides a sufficiently high data compression rate for the overall graphics data.

With the example shown in FIG. 1, the ROM 111 that stores the graphics data for the OSD is required to be provided to the timing controller 200R side. However, with the image display system 100 shown in FIG. 2, the graphics data does not need to be stored in such ROM. The memory 306 configured as SRAM or the like has an advantage of a lower cost as compared with ROM, thereby allowing the total cost to be reduced.

With the system shown in FIG. 1, the ROM 111 is configured as One-Time Programmable (OTP) ROM. Accordingly, in a case in which the graphics data for the OSD is to be changed or added, the ROM 111 needs to be replaced. In many cases, it is not possible to replace the ROM. Even in a case in which it is possible to replace the ROM, such ROM replacement requires enormous costs.

In many systems, instead of such one-time ROM, the microcontroller 130 is coupled to writable nonvolatile memory 140 such as a hard disk, Solid State Drive (SSD), Electrically Erasable Programmable Read-Only Memory (EEPROM), flash memory, or the like. Accordingly, with the image display system 100 shown in FIG. 2, by changing or adding the graphics data stored in the nonvolatile memory 140, this arrangement allows the graphics data for the OSD to be changed or added.

Figure 8A:
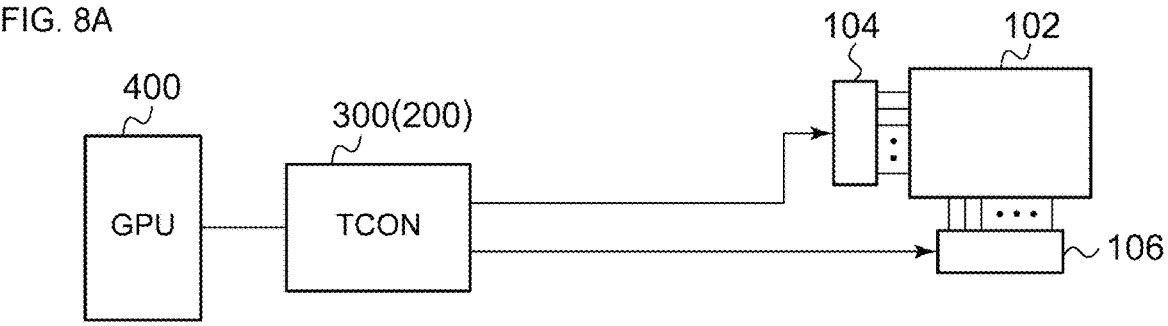
FIG. 8A through FIG. 8D are diagrams each showing a specific application of the semiconductor apparatus.

Next, description will be made regarding an application of the semiconductor apparatus 300. FIG. 8A through FIG. 8D are diagrams each showing a specific application of the semiconductor apparatus 300. FIG. 8A shows the semiconductor apparatus 300 configured as a timing controller 200. The timing controller 200 receives the digital video signal $S_2$ from the graphics processor 400 so as to control the gate driver 104 and the source driver 106.

Figure 8B:
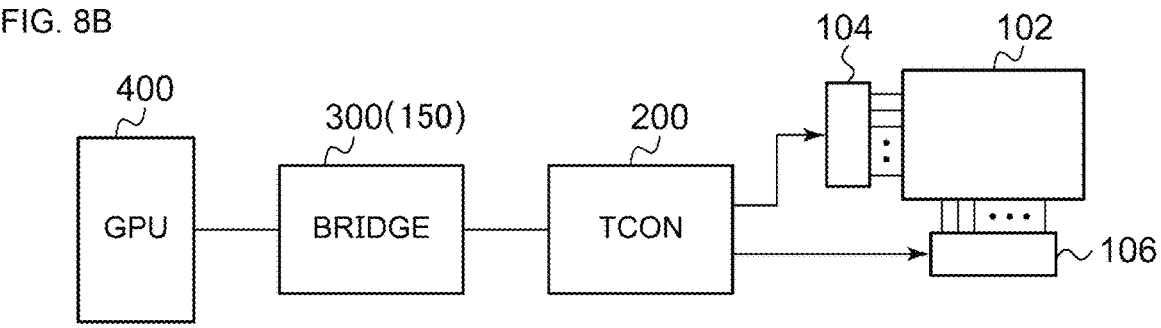

FIG. 8B shows the semiconductor apparatus 300 configured as a bridge chip 150. The bridge chip 150 is arranged between the graphics processor 400 and the timing controller 200. The bridge chip 150 functions as a bridge between an output interface of the graphics processor 400 and an input interface of the timing controller 200.

Figure 8C:
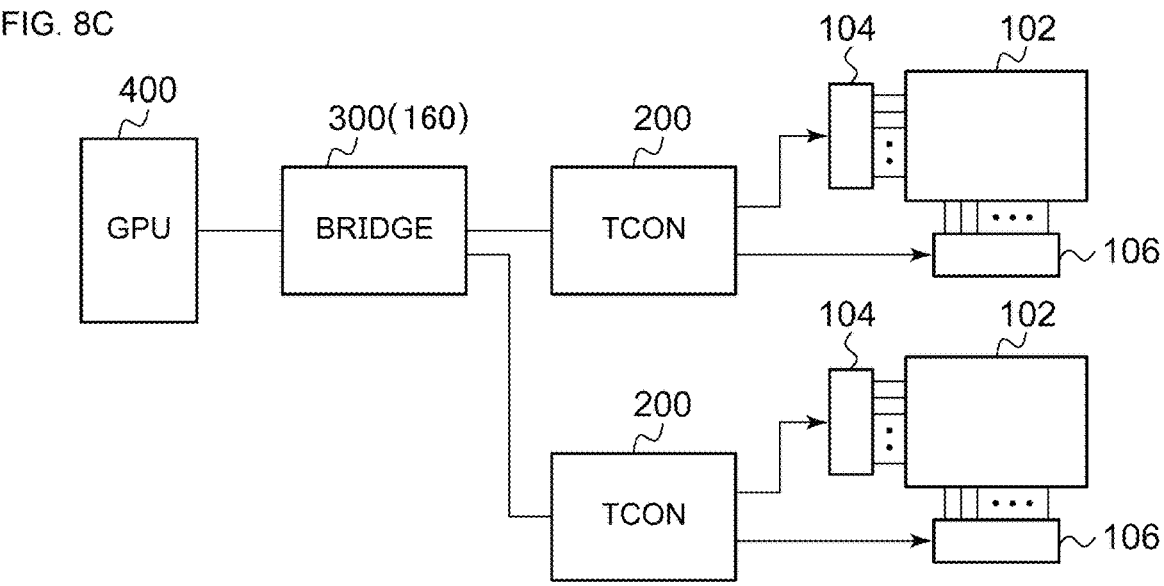

FIG. 8C shows the semiconductor apparatus 300 configured as a bridge chip 160. The bridge chip 160 branches a video signal received from the graphics processor 400 into multiple lines. The bridge chip 160 may distribute the same video signal as the input video signal to multiple lines. Alternatively, the bridge chip 160 may divide the input video signal into multiple regions (screens), and may distribute the multiple regions thus divided to respective multiple lines.

Figure 8D:
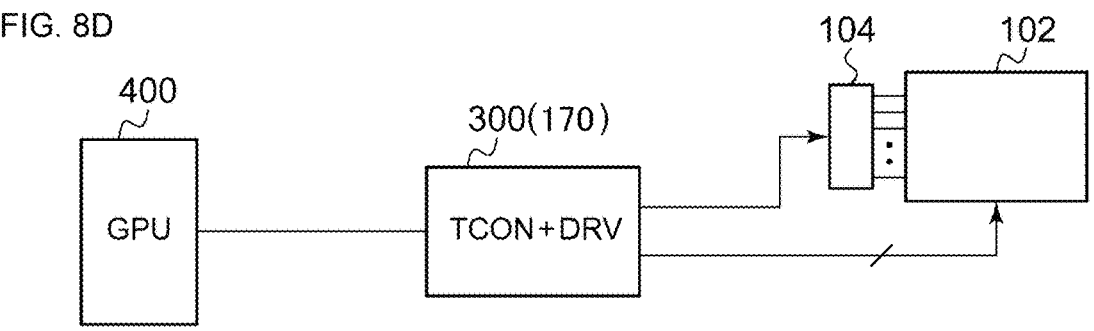

FIG. 8D shows the semiconductor apparatus 300 configured as a one-chip driver 170. The one-chip driver 170 is provided with a function of a timing controller and a function of a display driver (source driver).

The image display systems shown in FIG. 8A through FIG. 8D can be employed for various kinds of display apparatuses such as in-vehicle displays, medical displays, TVs, PC displays, etc. Also, such an image display system may be built into various kinds of electronic devices such as laptop computers, tablet terminals, smartphones, digital still cameras, digital video cameras, etc.

Figure 9:
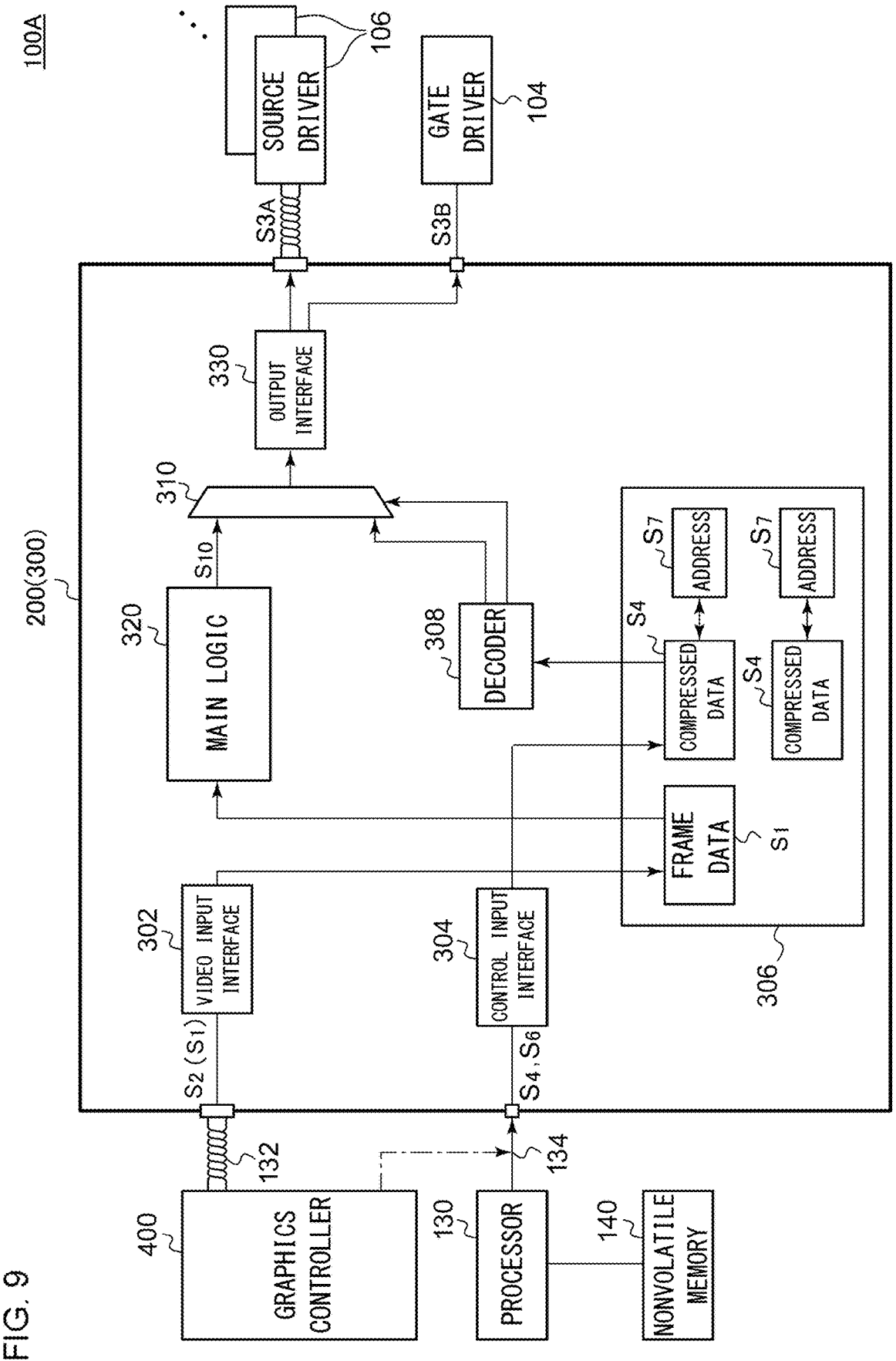
FIG. 9 is a block diagram showing an example configuration of a timing controller.

FIG. 9 is a block diagram showing an example configuration of the timing controller 200. The timing controller 200 receives the digital video signal $S_2$ from the graphics processor 400, supplies image data $S_{3A}$ to one or multiple source drivers 106, and outputs a control/synchronization signal $S_{3B}$ to the gate driver 104 and one or multiple source drivers 106.

The timing controller 200 includes a main logic 320 and an output interface 330 in addition to the video input interface 302, the control input interface 304, the memory 306, the decoder 308, and the multiplexer 310 described above.

The video input interface 302, the main logic 320, and the output interface 330 form a circuit block for displaying the image data received from the graphics processor 400. Such a circuit block may have the same configuration as that included in the timing controller 200R according to a conventional technique. The video data $S_1$ received by the video input interface 302 may be stored in the memory 306 as frame data.

The main logic 320 executes various kinds of signal processing on the video data S (frame data). The signal processing supported by the main logic 320 is not restricted in particular. The signal processing may preferably be supported using a known technique. Examples of such signal processing include gamma (γ) correction, Frame Rate Control (FRC) processing, RGB mapping, etc. The output interface 330 outputs the output image data $S_{3A}$ subjected to the processing supported by the main logic 320 to the source driver 106. Furthermore, the main logic 320 generates the control/synchronization signal $S_{3B}$ to be supplied to the gate driver 104 and the source driver 106.

The control input interface 304, the decoder 308, and the multiplexer 310 are provided for supporting the OSD function.

Immediately after a power supply is turned on, the timing controller 200 is set to the setup state. For example, in the start-up operation, as a previous stage before the timing controller 200 receives the video input data and outputs the video input data thus received to a panel, a setting period (initializing period) is provided for setting parameters or the like to be used in gamma correction or RGB mapping. A part of the initializing period may be defined as the "setup state".

Also, the timing controller 200 may be configured such that it is set to the setup state upon receiving a command supplied from an external circuit. For example, the timing controller 200 may include a register as a built-in component for supporting the setup state. The timing controller 200 may be configured such that, upon writing "1" to the register from an external circuit (e.g., the microcontroller 130), the timing controller 200 is switched to the setup state. This arrangement allows the timing controller 200 to be switched to the setup state at a desired timing in addition to immediately after the timing controller 200 is started up.

In the setup state, the control input interface 304 receives, from the microcontroller 130, the compressed image data $S_4$ obtained by compressing the graphics data $S_5$ to be used for the On Screen Display (OSD).

In the normal state, the control input interface 304 receives the instruction signal $S_6$ including an ID that designates the graphics data to be displayed. The decoder 308 refers to the address information $S_7$ that corresponds to the ID, and reads a corresponding one item of the compressed image data $S_4$ from the memory 306, according to the ID information. Furthermore, the decoder 308 decodes the compressed image data $S_4$, so as to reproduce the original graphics data $S_5$.

The multiplexer 310 superimposes the graphics data $S_5$ on the frame data output from the main logic 320, and outputs the frame data to the output interface 330.

Figure 10A:
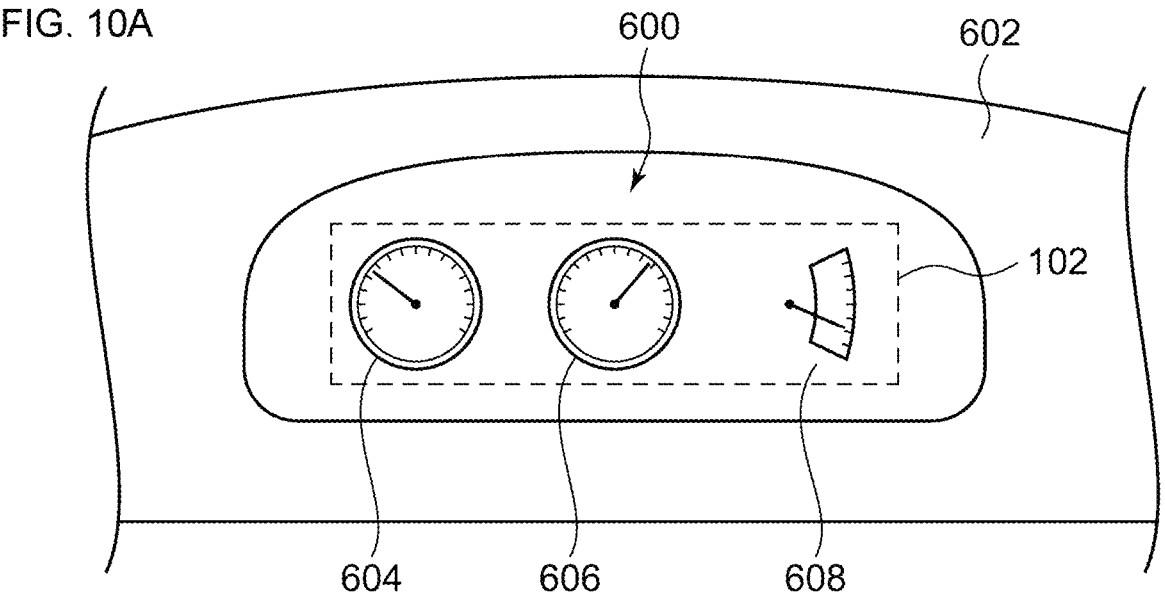
FIG. 10A through FIG. 10C are diagrams each showing an in-vehicle display apparatus employing a timing controller.

FIG. 10A is a diagram showing an in-vehicle display apparatus 600 according to an embodiment. The in-vehicle display apparatus 600 is embedded in a console 602 arranged in the front of a cockpit. The in-vehicle display apparatus 600 receives video data $S_1$ including speedometer data 604, tachometer data 606 that indicates the rotational speed of an engine, remaining fuel data 608, and remaining battery charge data in a case in which the vehicle is configured as a hybrid vehicle or an electronic vehicle, etc., and displays the items to be displayed (FIG. 10A).

Figure 10B:

With conventional arrangements, as shown in FIG. 10B, indicator lamps or warning lamps that indicate some kind of abnormal state or that a battery has run out (which will be collectively referred to simply as the "warning lamps" hereafter) are provided as individual LEDs each configured as an external component of the display panel. The reason why such a warning lamp is not displayed on the display panel is as follows. That is to say, the semiconductor apparatus 300 (timing controller 200) and the graphics controller 110 are coupled via a differential serial interface.

During a period from the start-up operation of the system up to the link establishment supported by the serial interface between the timing controller 200 and the graphics controller 110, such an arrangement is not able to transmit image data. Accordingly, in this period, no image can be displayed on the display panel 102. Also, if link disconnection occurs due to noise effects after the link has been established, such an arrangement is not able to display any image on the display panel 102 before the link is established again. Also, the same problem occurs when a cable is detached or disconnected, or when a malfunction occurs in a part of the serial interface or the graphics controller 110. Such a state in which an image cannot be displayed will be referred to as a "non-displayable state".

A warning lamp notifies the driver of important information. Accordingly, such a warning lamp is required to operate even in the non-displayable state. Giving consideration to such a situation, such a warning lamp is required to be provided as an external component of the display panel.

In contrast, with the timing controller 200 according to the embodiment or with other embodiments of the semiconductor apparatus 300, such an arrangement allows such a warning lamp to be displayed on the display panel as the graphics data $S_5$ for the OSD. This is because such an OSD display function does not require the communication supported by the differential serial interface. This arrangement requires no LED and a driving circuit thereof, thereby providing reduced costs. Furthermore, such an arrangement requires only an ECU standard function such as $I^2C$ or the like, thereby providing further reduced costs.

Figure 10C:
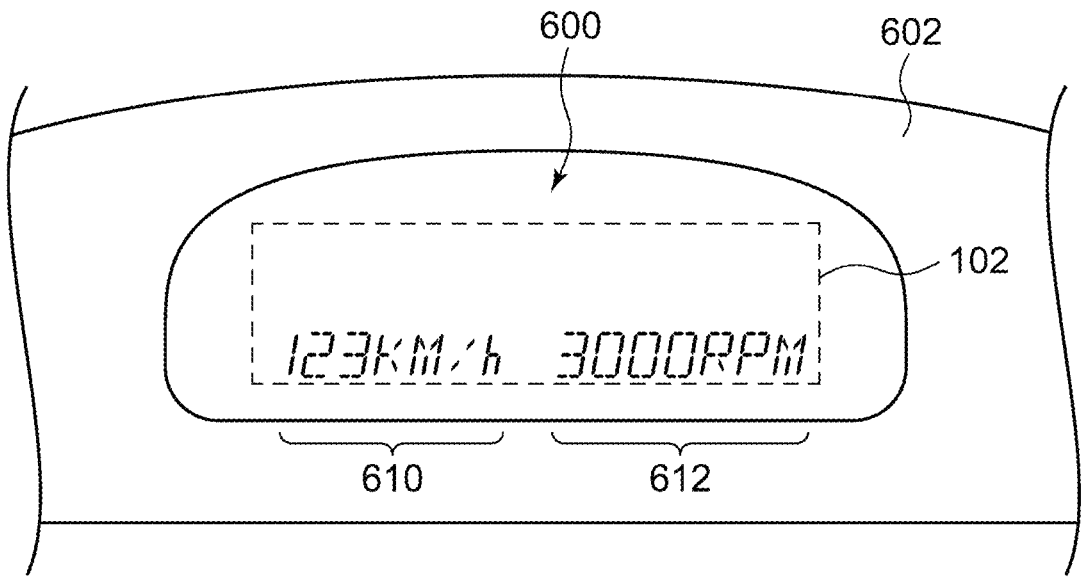

Also, when a situation (non-displayable state) in which the video data $S_1$ cannot be displayed occurs in the in-vehicle display apparatus 600, the display panel 102 blacks out, leading to difficulty in driving the vehicle. In order to solve such a problem, alphabetic and numeric characters may be prepared in the form of OSD graphics data $S_5$. When the speedometer 604 or tachometer 606 cannot be displayed due to the occurrence of some kind of abnormal state during driving of the vehicle, this arrangement is capable of displaying the vehicle speed information 610 and the engine rotational speed information 612 in a real-time manner using the OSD function as shown in FIG. 10C, thereby providing improved safety.

Also, when the user turns on the ignition of the vehicle, in the start-up operation of the in-vehicle display apparatus 600, such an arrangement allows a given character string such as "PLEASE WAIT . . . ", a character string that represents the current time, or the like, to be displayed using the OSD function before the video data $S_1$ can be displayed.

Also, the timing controller 200 configured as an embodiment of the semiconductor apparatus 300 may be employed in a medical display apparatus. The medical display apparatus displays necessary information for medical doctors and nurses in a medical examination, medical treatment, or surgery. The timing controller 200 allows such a medical display apparatus to display important information (e.g., the heart rate, blood pressure, and the like, of a patient) using the OSD function even in a situation in which the video data $S_1$ cannot be displayed.

Figure 11:
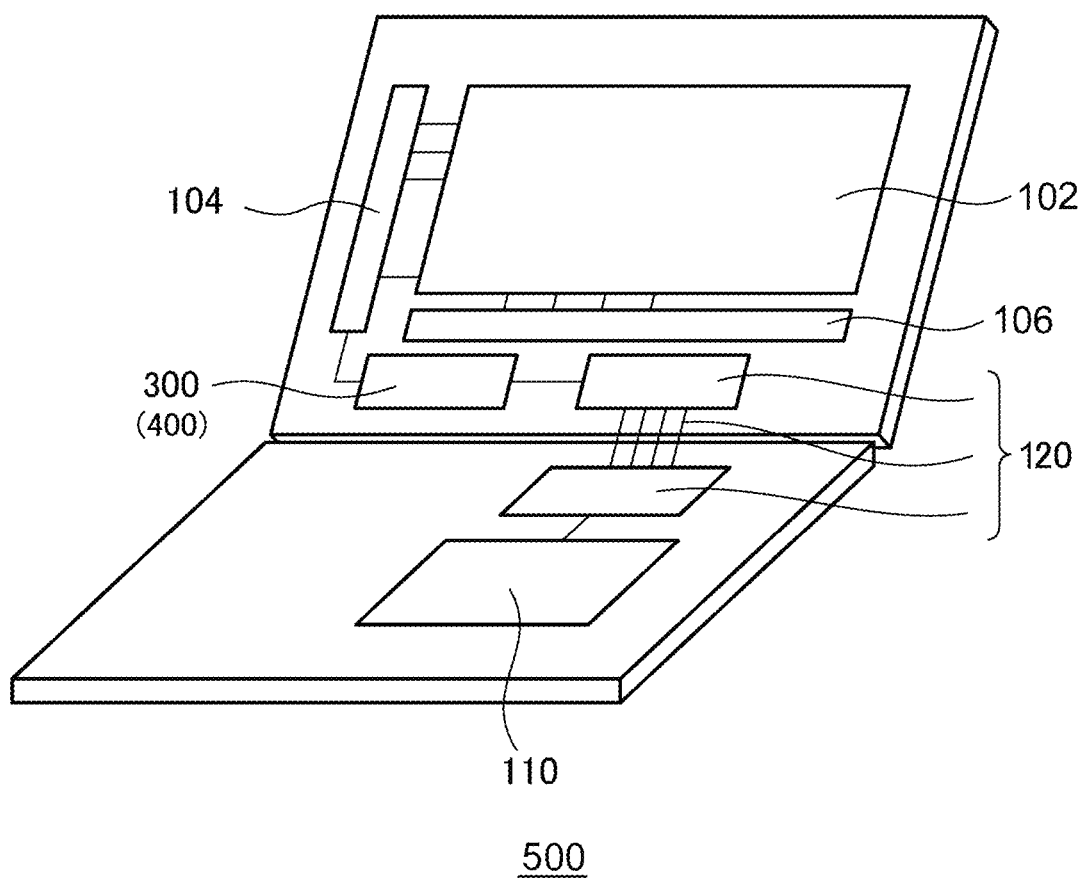
FIG. 11 is a perspective diagram showing an electronic device.

FIG. 11 is a perspective view showing an electronic device 500. The electronic device 500 shown in FIG. 11 may be configured as a laptop computer, a tablet terminal, a smartphone, a portable game machine, an audio player, or the like. The electronic device 500 includes a graphics controller 110, a display panel 102, a gate driver 104, and a source driver 106, each of which is built into a housing 502. A transmission apparatus 120 including a differential transmitter, a propagation path, and a differential receiver may be arranged between the timing controller 200 and the graphics controller 110.

Description has been made above regarding the present disclosure with reference to the embodiment. The above-described embodiment has been described for exemplary purposes only, and is by no means intended to be interpreted restrictively. Rather, it can be readily conceived by those skilled in this art that various modifications may be made by making various combinations of the components or processes, which are also encompassed in the technical scope of the present disclosure. Description will be made below regarding such modifications.

First Modification

Description has been made in the embodiment regarding an arrangement in which the OSD graphics data $S_5$ is displayed with the frame data as a background. The present disclosure is not restricted to such an arrangement. Also, the OSD graphics data may be displayed in a transparent manner or a semitransparent manner using alpha blending. In this case, the color data CD may be employed as an alpha value that represents the transparency level. This arrangement allows the background of the graphics data $S_5$ to be superimposed and displayed on the frame data in a transparent manner or a semitransparent manner.

Second Modification

The format of the control input interface 304 is not restricted to such a register access interface. For example, as with the first line 112, the control input interface 304 may be designed to support differential serial transmission. That is to say, the control input interface 304 may be designed with a desired interface.

Third Modification

Description has been made in the embodiment regarding an arrangement in which both the graphics data $S_5$ to be handled in the setup state and the instruction signal $S_6$ to be handled in the normal state are received via the control input interface 304 configured as a common interface. Also, the graphics data $S_5$ and the instruction signal $S_6$ may be received via separate interfaces.

Fourth Modification

Description has been made in the embodiment regarding an arrangement employing the run-length compression method, which can be implemented easily. Also, other kinds of image compression methods may be employed. Also, an error detection method such as a Cyclic Redundancy Check (CRC) method may be applied to the graphics data $S_5$ or the instruction signal $S_6$. Also, instead of employing the CRC method, other kinds of error detection methods such as a parity method, checksum method, etc., may be applied.

Fifth Modification

Description has been made in the embodiment regarding an arrangement in which the graphics data is compressed beforehand, and the compressed graphics data is stored in the nonvolatile memory 140 provided to the microcontroller 130. However, the present disclosure is not restricted to such an arrangement. Also, the nonvolatile memory 140 may store uncompressed graphics data (or image data compressed in a different data format). In the setup state, after the microcontroller 130 compresses the graphics data in a format supported by the decoder 308 of the semiconductor apparatus 300, the microcontroller 130 may transmit the compressed graphics data.

While the preferred embodiments of the present disclosure have been described using specific terms, such description is for illustrative purposes only, and it is to be understood that changes and variations may be made without departing from the spirit or scope of the appended claims.

What is claimed is:

1. A semiconductor apparatus comprising:
    a video input interface structured to receive video data in a normal state;
    a memory;
    a control input interface structured, in a setup state, to receive a plurality of items of compressed image data, and to store the compressed image data in the memory; and
    a decoder structured, in the normal state, to read from the memory one item that corresponds to an instruction signal from among the plurality of items of compressed image data, and to decode the compressed image data thus read, so as to reproduce original graphics data before compression; and
    a multiplexer structured to superimpose the graphics data on the video data,
    wherein the compressed image data is generated by compressing the graphics data using a run-length compression method,
    wherein the compressed image data includes at least one item of segment data,
    wherein each segment data represents a same-color segment comprising consecutive pixels having the same color,
    and wherein the same-color segment extends over multiple lines for consecutive pixels representing the same color over the multiple lines.

2. The semiconductor apparatus according to claim 1, wherein the segment data comprises color data that represents color and a run-length value that represents a number of consecutive pixels,
    and wherein the run-length value is configured to have a variable format length.

3. The semiconductor apparatus according to claim 2, wherein the segment data comprises:
    a color word comprising a separator bit and the color data; and
    at least one run-length word each comprising a separator bit and a run-length value.

4. The semiconductor apparatus according to claim 2, wherein the segment data comprises:
    a color word comprising the color data;
    a word-number indication bit that indicates a number of words that represent the run-length value; and
    run-length words, a number of which matches the number of words represented by the word-number indication bit.

5. The semiconductor apparatus according to claim 1, wherein the control input interface receives size data that indicates a pixel size of the graphics data,
    and wherein the control input interface stores the compressed image data in the memory together with the size data thus received.

6. The semiconductor apparatus according to claim 1, wherein the instruction signal comprises position information that indicates a position at which the graphics data is to be displayed,
    and wherein the multiplexer displays the graphics data at a position that corresponds to the position information.

7. The semiconductor apparatus according to claim 1, wherein the control input interface is structured as a Serial Peripheral Interface (SPI) or an Inter-Integrated Circuit (I²C) interface.

8. The semiconductor apparatus according to claim 1, structured as a timing controller.

9. The semiconductor apparatus according to claim 1, structured as a one-chip driver provided with a function of a timing controller and a function of a source driver.

10. The semiconductor apparatus according to claim 1, structured as a bridge circuit.

11. A display apparatus comprising the semiconductor apparatus according to claim 1.

12. An electronic device comprising the semiconductor apparatus according to claim 1.

* * * * *